3,328,441
PREPARING ORGANOTIN MERCAPTIDES BY REACTING DIORGANOTIN OXIDES WITH ESTERS OF THIOCARBOXYLIC ACIDS
Ashley H. Freiberg, Santa Clara, Calif., and Carl C. Greco, Bronx, N.Y., assignors to Stauffer Chemical Company, New York, N.Y., a corporation of Delaware
No Drawing. Filed Dec. 10, 1963, Ser. No. 329,397
6 Claims. (Cl. 260—429.7)

This invention relates to organotin compounds and in particular to organotin mercaptides. The invention also pertains to the preparation of the aforesaid compounds.

In accordance with the present invention, it has been discovered that a disubstituted organotin oxide and a thioacetic ester are capable of reacting with one another whereby there is formed a hitherto unknown class of organotin compounds which can be regarded as organotin mercaptides and the provision of these new chemical entities constitutes the principal object and purpose of the invention. It is also an important object of the invention to provide a method of preparing the organotin compounds. Other objects and purposes will become manifest as the description proceeds.

The new and novel organotin mercaptides as contemplated herein are illustrated collectively by the following chemical formula:

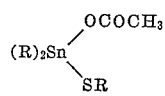

wherein R represents a hydrocarbon residue as exemplified by an alkyl radical of from 1 to 12 carbon atoms e.g. methyl, ethyl, n-propyl, isobutyl, n-butyl, n-pentyl, iso-hexyl, n-hexyl, n-heptyl, n-nonyl, n-decyl, n-dodecyl, 3-dodecyl, etc., and a phenyl radical.

As previously pointed out, the organotin mercaptides of the invention were discovered as the reaction product of a disubstituted organotin oxide with thioacetic ester, and as can be seen from an inspection of the chemical equation delineated below, the thioacetic ester adds across the tin oxygen linkage as if the latter were a double bond. It is to be noted that the reactants enter ino direct combination to form the organotin mercaptides there being no concomitant by-products as characterizes metathetical reactions. The above referred to equation is deemed to proceed as follows:

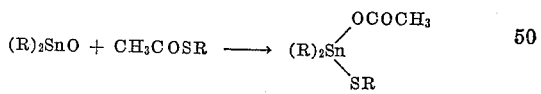

wherein R has the significance as previously set forth.

In preparing the organotin mercaptides of the invention it has been ascertained that generally excellent results ensue by heating the disubstituted organotin oxide with the thioacetic ester preferably in the presence of a liquid organic media and in this connection the normally liquid hydrocarbons are recommended. Solvents which are particularly suitable include the lower saturated aliphatic carbons, such as, hexane, heptane, and the like, and the liquid aromatic hydrocarbons as exemplified by benzene, toluene, xylene, and the like. Other solvents which are suitable in practicing the invention are the chlorinated and ether derivatives of the aforenamed hydrocarbons. It has been our experience that the reaction is most conveniently performed by refluxing the components in the presence of the organic solvent after which the organotin mercaptide is isolated by crystallization, sublimation, distillation, or any of the other techniques commonly employed in the organic chemistry art.

In order to describe the compounds and process of preparing them in greater detail, reference is now made to the following examples which are submitted for the purpose of illustration only, and are not to be construed as placing any limitation on the invention. It is further to be understood that without departing from the spirit or scope of the invention variations of practicing the same will occur to those skilled in the art.

Example 1

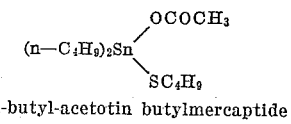

Di-n-butyl-acetotin butylmercaptide

In a 500 ml. flask equipped with a stirrer, thermometer, and reflux condenser was placed a mixture consisting of 12.5 g. (0.05 mole) of dibutyltin oxide suspended in a solution of 6.6 g. (0.05 mole) of butylthioacetate in 150 ml. of toluene. The contents of the flask were slowly heated until the temperature reached 100° C. at which point all solid materials had undergone dissolution. After refluxing for a period of 2 hours, the reaction material was cooled to room temperature followed by subjection to vacuum distillation. After removing solvent and volatile components there was collected 13.0 g. of a colorless liquid boiling at 140° C./0.3 mm. The elemental and spectroscopic analysis of the product were in conformity with the above depicted structure.

Example 2

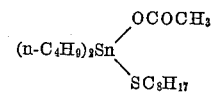

Di-n-butyl-acetotin octylmercaptide

This compound was prepared in accordance with the procedure given in Example 1 but using 8.0 g. (0.032 mole) of dibutyltin oxide and 6.0 g. (0.032 mole) of octylthio acetate. The product was obtained in the form of a colorless residual liquid, the elemental and chemical analysis of which were in consonance with the above shown configuration. The yield of product amounted to 12.0 g. which corresponded to a yield of 90%.

Example 3

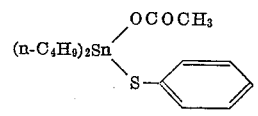

Di-n-butyl-acetotin phenylmercaptide

The compound of this example was prepared following the procedure of the previous example but using as reactants 12.5 g. (0.05 mole) of dibutyltin oxide and 7.1 g. (0.05 mole) of phenylthio acetate. In this instance there was obtained 18.0 g. (85% yield) of a colorless residual liquid. This product when subjected to elemental and spectroscopic examination was shown to have a chemical structure as above depicted.

Example 4

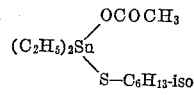

Diethyl-acetotin isohexylmercaptide

Following the method set forth in the previous examples the above depicted organotin mercaptide was obtained using equivalent quantities of diethyltin oxide and iso-hexylthioacetate. In general, the yield and results paralleled those obtained with the previous examples.

The organotin mercaptides as set forth herein are valuable and useful chemical entities in that they exhibit biological activity. In this connection they have been discovered to be especially effective in controlling or combating a variety of noxious microorganisms particularly those types afflicting valuable food crops, such as, corn blight, rust, mildew and the like. Specific microorganisms succumbing to the action of the organotin compounds of the invention include *Aspergillus niger,* Penicillium sp., *Escherichia coli, Rhizoctonia solani* and *Fusarium solani.*

We claim:

1. A method of preparing an organotin mercaptide of the following formula:

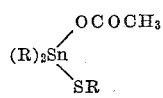

wherein R is selected from the class consisting of an alkyl radical of from 1 to 12 carbon atoms and phenyl, which comprises reacting a disubstituted tin oxide of the formula $(R)_2SnO$ with a thioacetic ester of the formula $$CH_3COSR$$

wherein R has the significance as above set forth and isolating the so obtained organotin mercaptide.

2. The method of claim 1, wherein the disubstituted tin oxide reactant is a dialkyltin oxide, said alkyl groups containing from 1 to 12 carbon atoms respectively.

3. The method of claim 1, wherein the disubstituted tin oxide is a dibutyltin oxide.

4. The method of claim 1, wherein the disubstituted tin oxide is diethyltin oxide.

5. The method of claim 1, wherein the thioacetic ester is an alkyl thioacetic ester, said alkyl having from 1 to 12 carbon atoms.

6. The method of claim 1, wherein the thioacetic ester is a phenyl thioacetic ester.

References Cited

UNITED STATES PATENTS

| 2,684,973 | 7/1954 | Mack et al. | 260—429.7 |
| 2,914,506 | 11/1959 | Mack et al. | 260—429.7 |

TOBIAS E. LEVOW, *Primary Examiner.*
W. F. W. BELLAMY, *Assistant Examiner.*